United States Patent [19]

Schellinger

[11] Patent Number: 5,349,588
[45] Date of Patent: Sep. 20, 1994

[54] ERROR DETECTING METHOD AND APPARATUS FOR DATA COMMUNICATIONS

[75] Inventor: Michael J. Schellinger, Vernon Hills, Ill.

[73] Assignee: Motorola, Inc., Schaumburg, Ill.

[21] Appl. No.: 903,206

[22] Filed: Jun. 23, 1992

Related U.S. Application Data

[63] Continuation-in-part of Ser. No. 832,118, Feb. 6, 1992.

[51] Int. Cl.[5] ............................................. H04L 5/08
[52] U.S. Cl. ...................................... 371/37.1; 371/6; 371/36
[58] Field of Search ............. 371/37.1, 37.2, 5.1, 371/6, 29.1, 32, 37.7, 38.1, 36

[56] References Cited

U.S. PATENT DOCUMENTS

| | | | |
|---|---|---|---|
| 4,302,845 | 11/1981 | McClaughry et al. | 375/82 |
| 4,562,582 | 12/1985 | Tokura | 375/87 |
| 4,779,088 | 10/1988 | Restrepo | 340/825.5 |
| 4,807,260 | 2/1989 | Solina | 375/110 |
| 4,976,413 | 10/1990 | Otani | 371/37.7 |
| 4,989,230 | 1/1991 | Gillig | 379/59 |
| 5,012,467 | 4/1991 | Crane | 370/85.3 |
| 5,070,504 | 12/1991 | Bossen et al. | 371/37.1 |
| 5,241,548 | 8/1993 | Dillon et al. | 371/36 |

Primary Examiner—Vincent P. Canney
Attorney, Agent, or Firm—Rolland R. Hackbart

[57] ABSTRACT

A unique method and apparatus processes and validates Manchester-coded data transmitted on a communications channel and containing a synchronization word and a data word including a plurality of data bits and coded according to a predetermined BCH error correcting code. Each data bit has a binary state determined by a left half non-return-to zero (NRZ) bit sample and a right half NRZ bit sample. The method for processing such data includes the steps of receiving a data word from the communications channel; checking the right half NRZ bit samples of the received data word according to the predetermined error correcting code to detect the number of erroneous bits (810); error correcting the right half NRZ bit samples of the received data word according to the predetermined error correcting code if the number of erroneous bits is less than a first predetermined number (814); comparing the left half NRZ bit samples to the error-corrected right half NRZ bit samples of the received data word to determine the number of data bits that are in error (824); and discarding the received data word if it has more than a second predetermined number of data bits that are in error (830). The novel method may be used in processing data communications in any suitable system, such as, for example, data communications in cellular radio telephone systems.

12 Claims, 5 Drawing Sheets

ERROR DETECTING METHOD AND APPARATUS FOR DATA COMMUNICATIONS

RELATED APPLICATIONS

This application is a continuation-in-part of the instant assignee's copending U.S. application, Ser. No. 07/832,118, filed Feb. 6, 1992, invented by Michael J. Schellinger, Robert F. D'Avello, and Robert K. Krolopp, and entitled "Dual System Cellular Cordless Radiotelephone Apparatus", which application is incorporated herein by reference.

BACKGROUND OF THE INVENTION

The present invention relates generally to data communications, and more particularly to an improved method and apparatus for detecting errors in data communications, such as, for example, data communications in cellular radio telephone systems.

Radio telephone systems provide telephone service to handheld portables and vehicular mobiles by means of radio base stations, microcellular base stations, and control terminals coupled to telephone company phone system (TELCO) by telephone landlines. Such systems may also include cordless base stations located in a home or building and coupled to a telephone landlines for providing local telephone service when in the home or building (see, for example, U.S. Pat. No. 4,989,230). In such radio telephone systems, telephone calls are typically originated and terminated by means of data communications over dedicated signalling radio channel. Such data communications consist of one or more frames containing a synchronization word and a data word or message transmitted individually or in multiword packets. The synchronization word is selected to be a unique sequence of bits for defining the beginning of the following data word. In US cellular telephone systems, the data communications on the signalling radio channels is Manchester encoded and transmitted at a 10 kilo-bit rate. The format of the synchronization word and data words for US cellular telephone systems is specified in Electronic Industries Associates Standard EIA-553.

Since radio signals are subject to interference and fading, bit errors may be introduced during transmission and reception of the data. In order to detect the presence of bit errors, parity bits are typically included with each frame of data. If the parity bits indicate that a received data word has an error, the data word may be discarded. The parity bits may also be coded to allow correction of one or more erroneous bits using any of a number of coding schemes, such as, for example, a Bose-Chaudhuri-Hocquenghem coding scheme. Then, if one of more bits of the received data word are erroneous, the erroneous bits may be corrected using the parity bits. However, it is possible that correcting a received data word may transform it into a valid data word different from that which was transmitted. Bit errors may also result in false synchronization and processing of a meaningless data word.

Problems introduced by bit errors may be reduced by increasing the number of bits in the synchronization word, increasing the number of parity bits, or correcting fewer bit errors. However, increasing the number of bits in a frame decreases data throughput, and correcting fewer bits causes more data words to be discarded. Accordingly, there is a need for an improved method and apparatus for detecting and correcting errors in radio data communications for cellular radio telephone systems.

SUMMARY OF THE INVENTION

Briefly described, the present invention encompasses a method and apparatus for processing data transmitted on a communications channel in a data word including a plurality of data bits. The method comprises the stops of: receiving a data word from the communications channel, each received data bit having a binary state represented by at least two non-return-to zero (NRZ) bit samples; comparing the bit samples of each data bit of the received data word to determine the number of data bits that are in error; and discarding the received data word if it has more than a predetermined number of data bits that are in error.

Figure 1:
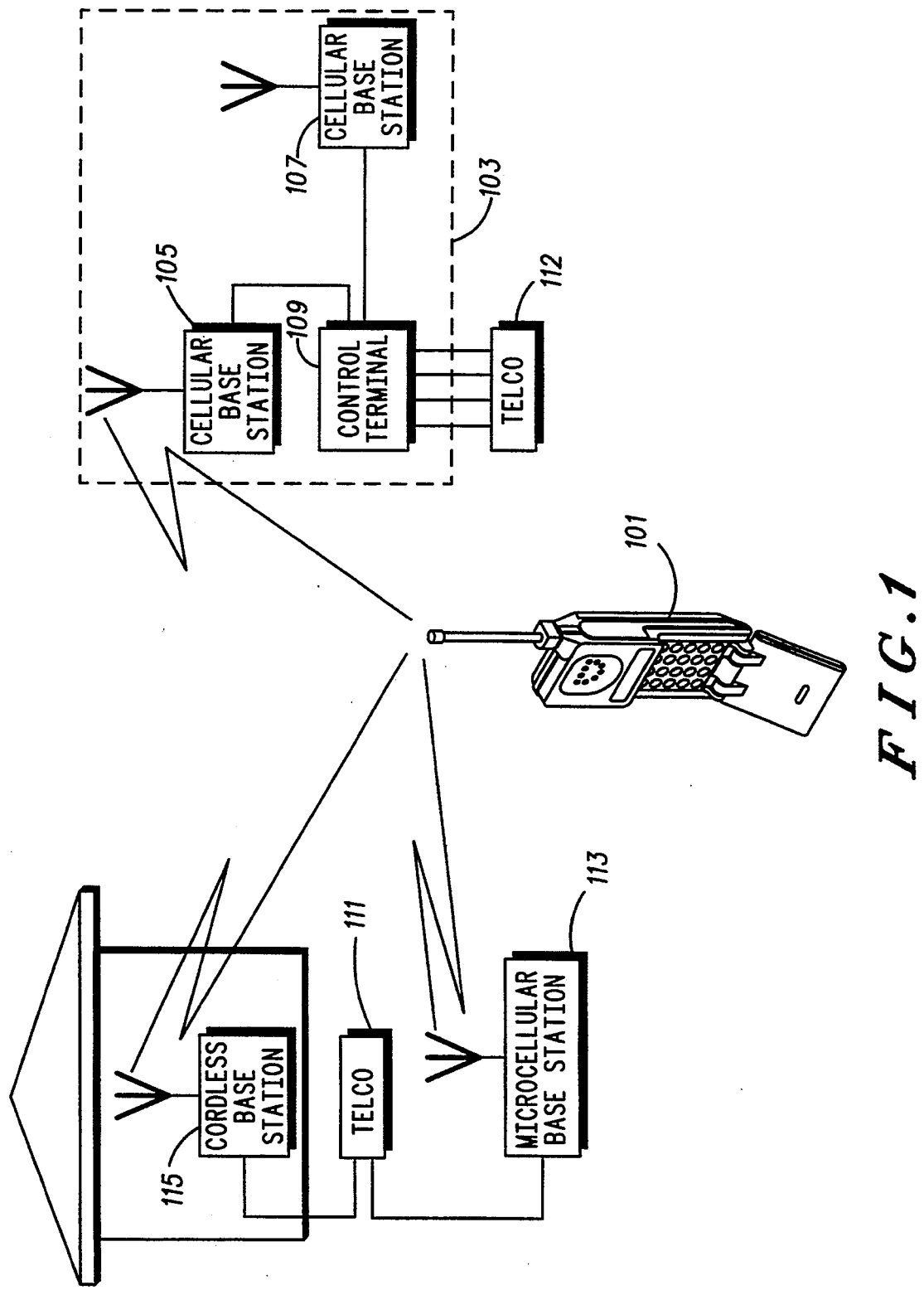
FIG. 1 is a block diagram of a radio telephone system including cordless base stations, cellular base stations, and microcellular base stations for providing radiotelephone service to a portable radiotelephone.

FIG's. 8 is a flowchart for the message validation process executed by the portable radiotelephone in FIG. 1.

Figure 9:
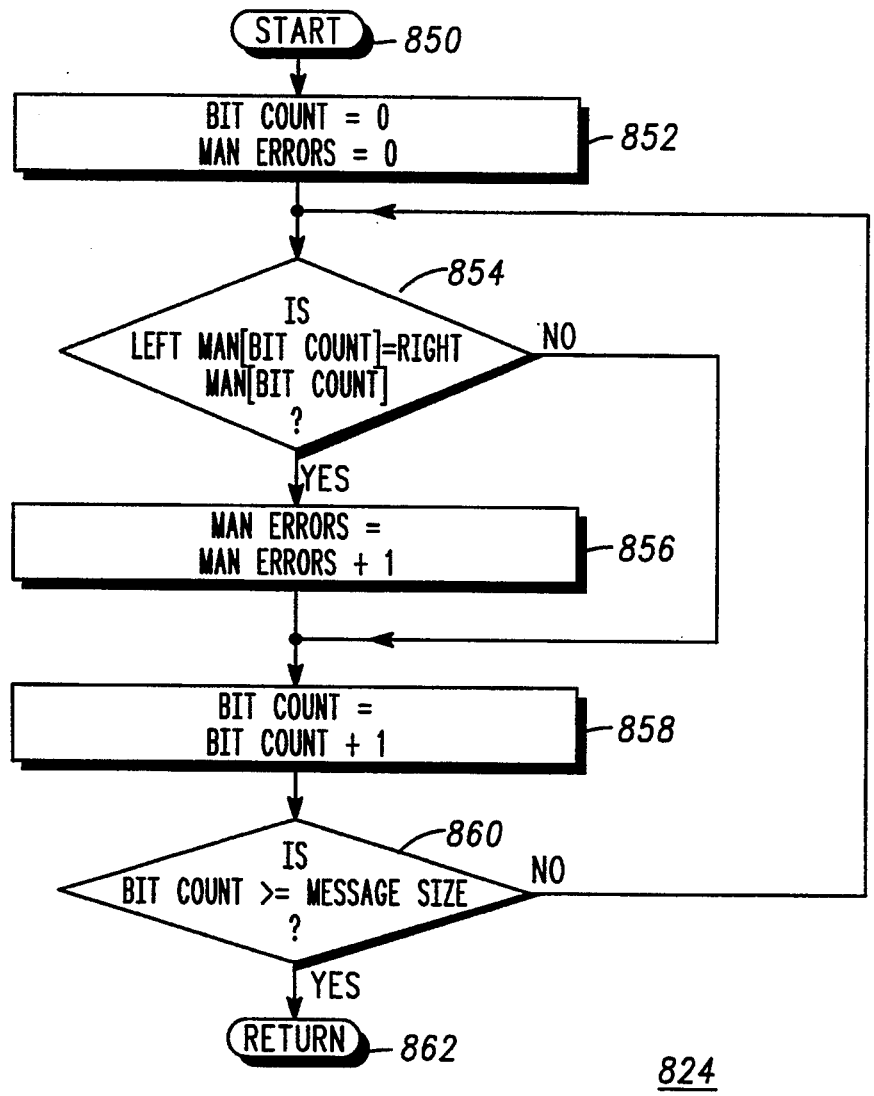

FIG. 9 is a flowchart for the MAN ERRORS calculation process executed by the portable radiotelephone in FIG. 1.

DESCRIPTION OF THE PREFERRED EMBODIMENT

A generalized block diagram of a radio telephone system is shown in FIG. 1. A portable cellular cordless (PCC) radiotelephone 101 is shown having the ability to communicate with a conventional cellular radiotelephone system 103, which has a plurality of cellular base stations 105 and 107 (see U.S. Pat. No. 4,485,486) located at geographically separate locations but arranged to provide radiotelephone coverage over a wide geographic area. The cellular base stations 105 and 107 are coupled to a control terminal 109 (see U.S. Pat. No. 4,268,722) which provides coordination among the cellular base stations, including handoff of user cellular mobile and portable equipment, and provides call switching and interconnect to the telephone company phone system (TELCO) 112. The PCC 101 may be implemented as shown and described in U.S. Pat. No. 4,989,230, incorporated herein by reference.

The PCC 101 further has the capacity to communicate with a microcellular base station 113, which has lower power and limited capabilities but provides public radiotelephone service to distinct, localized areas such as shopping malls, airports, etc. The microcellular base station 113 is coupled to the TELCO 111 for originating and receiving radiotelephone calls. TELCO 111 may be interconnected with or part of TELCO 112.

The PCC 101 further has the capability to communicate with and place radiotelephone calls via a cordless base station 115, which is connected by a private landline to the TELCO 111 for the user of the PCC 101. The cordless base station 115 and the PCC 101 together provide limited radio range service conventionally known as cordless radiotelephone service. The cordless base station 115 may be implemented as shown and described in U.S. Pat. No. 4,989,230.

Figure 2:
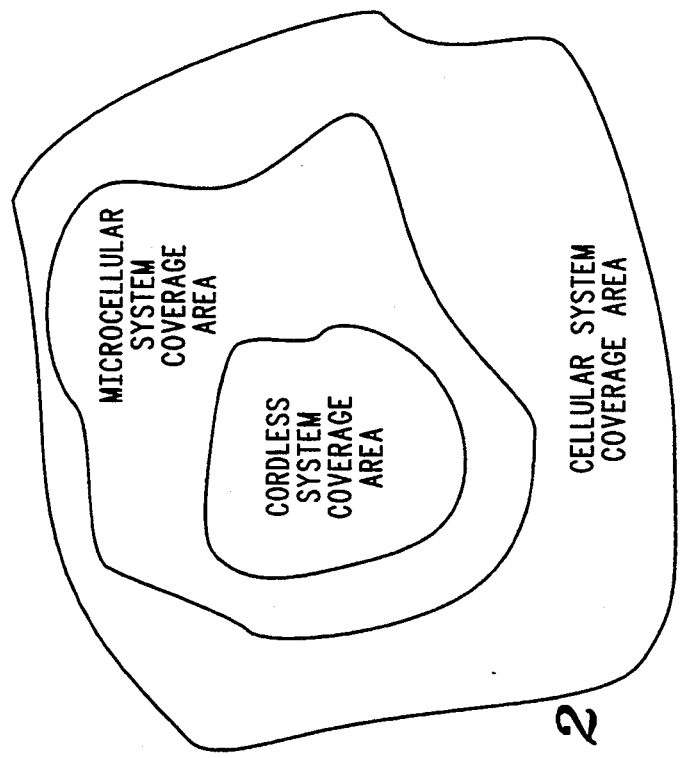
FIG. 2 is a map which shows a typical arrangement of geographical coverage areas for the cordless base station, cellular base stations, and microcellular base station in FIG. 1.

FIG. 2 shows a typical arrangement of geographical coverage areas for the for the cordless base station 115, cellular base stations 105 and 107, and microcellular base station 113 in FIG. 1. The cordless base station 115 coverage area is the smallest and resides within the microcellular coverage area. The microcellular base station 113 has intermediate coverage and resides within the cellular coverage area. The coverage area of each system may depend upon, but is not limited to, the number of each type of base stations, antenna height of each base station, and the power level of each base station. The user of the PCC 101 may freely move throughout the coverage areas of the base stations 105, 107, 113 and 115, automatically receiving radiotelephone service therefrom depending on location, service availability, and user preference. The coverage areas of the base stations 105, 107, 113 and 115 are not limited to the particular arrangement as shown in FIG. 2. For example, a coverage area of a base station may be independent of another coverage area or may partially overlap one or more other coverage areas.

The cordless base station 115, conceptually, is a subminiature cellular system providing a single signalling radio channel which transmits outbound data messages in a fashion analogous to a conventional cellular outbound signalling radio channel, and receives service requests via the signalling radio channel from the PCC 101. Proper service requests are granted with an assignment of a voice channel (made) on the same or a second radio frequency to which the PCC 101 is instructed to tune for its telephone call.

Figure 3:
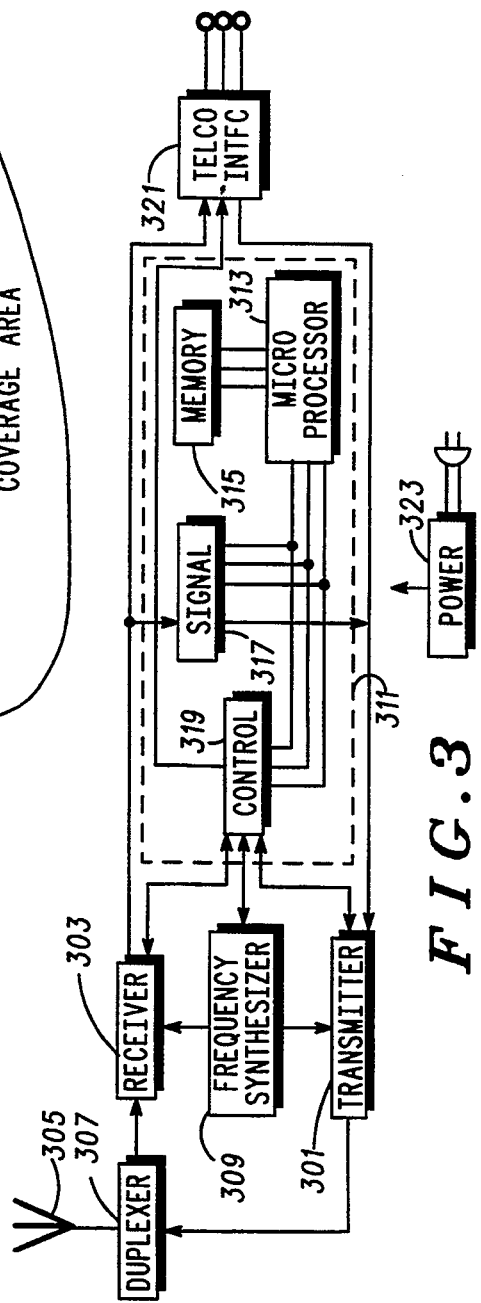
FIG. 3 is a block diagram of the cordless base station in FIG. 1.

The basic implementation of a cordless base station is shown in FIG. 3. A conventional transmitter 301 and a conventional receiver 303 suitable for use in the 869 to 894 MHz and 824 to 849 MHz band of frequencies, respectively, being used for conventional cellular services, are coupled to a common antenna 305 via a duplexer 307. The power output of the transmitter 301 is limited to approximately 6 milliwatts so that interference to other services and other cordless telephone stations is minimized. The channel frequency selection is implemented by a frequency synthesizer 309 controlled by a logic unit 311. Within the logic unit 311 is a microprocessor 313, such as a 68HC11 available from Motorola, Inc., or similar microprocessor, which is coupled to conventional memory devices 315 which store the microprocessor operating program, base identification (BID) and customizing personality, and other features. Received and transmitted data is encoded/decoded and coupled between the receiver 303, the transmitter 301, and the microprocessor 313 by signalling interface hardware 317. The microprocessor instructions are conveyed and implemented by control hardware 319. Interface with the user's home landline telephone line is conventionally accomplished via a TELCO interface 321. Power is supplied from the conventional AC mains and backed-up with a battery reserve (all depicted as power 323).

Figure 4:
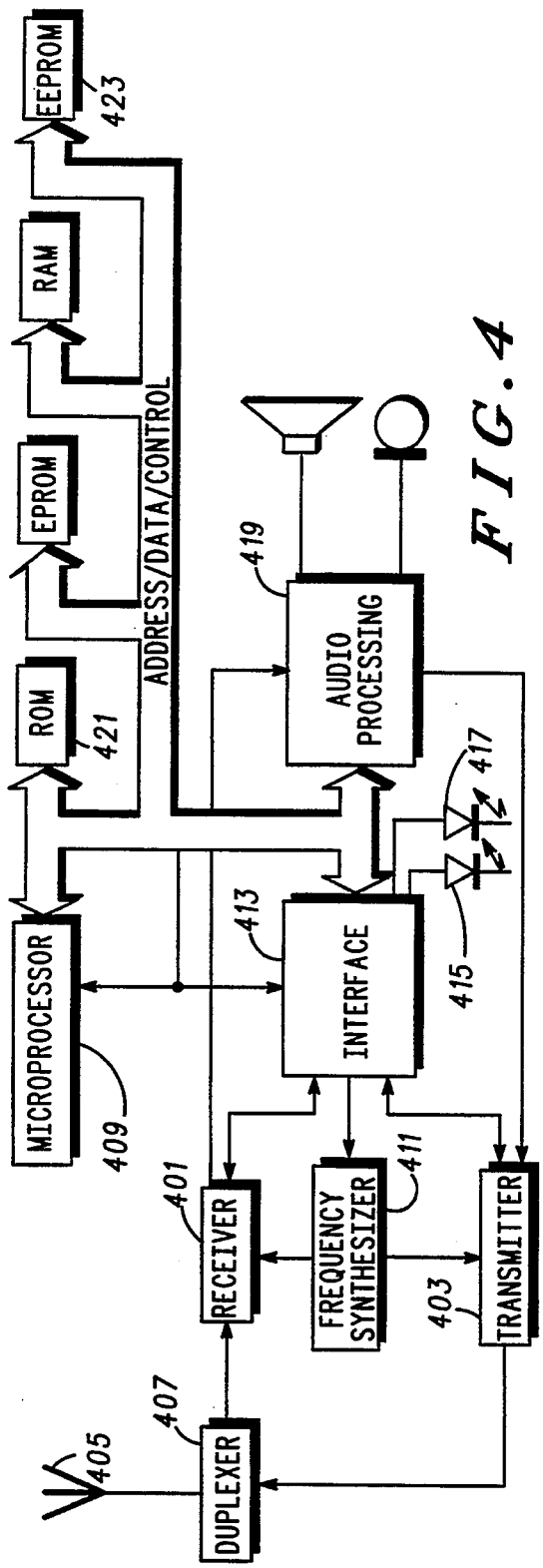
FIG. 4 is a block diagram of the portable radiotelephone in FIG. 1.

The PCC 101 is a portable radiotelephone transceiver which is shown in block diagram form in FIG. 4. A portable radio receiver 401, capable of receiving the band of frequencies between 869 and 894 MHz, and a portable transmitter 403, capable of transmitting with low power (the lowest power level being approximately six milliwatts) on frequencies between 824 and 849 MHz, are coupled to the antenna 405 of the PCC 101 by way of a duplexer 407. The particular channel of radio frequency to be used by the transmitter 403 and the receiver 401 is determined by the microprocessor 409 and conveyed to the frequency synthesizer 441 via the interface circuit 413. Data signals received by the receiver 401 are decoded and coupled to the microprocessor 409 by the interface circuit 413 and data signals to be transmitted by the transmitter 403 are generated by the microprocessor 409 and formatted by the interface 4 13 before being transmitted by the transmitter 403. Interface circuit 413 may include suitable Manchester data decoding circuitry, such as, for example, the data alemodulator described in U.S. Pat. No. 4,302,845, incorporated herein by reference. Operational status of the transmitter 403 and the receiver 401 is enabled or disabled by the interface 413. The interface also controls light emitting diodes, 415 and 417, which are used to indicate to the user which system the PCC 101 is currently receiving. Control of user audio, the microphone output and the speaker input, is controlled by audio processing circuitry 419.

The microprocessor 409 is preferably a 68HC11 microprocessor, available from Motorola, Inc., and performs the necessary processing functions under control of programs stored in conventional ROM 421. Characterizing features of the PCC 101 are stored in EEPROM 423 (which may also be stored in microprocessor on-board EEPROM) and include the number assignment (NAM) required for operation in a conventional cellular system and the base identification (BID) required for operation with the user's own cordless base.

The transmitter 403 of the PCC 101 has the capability of transmitting with the full range of output power which is required for operation in a conventional cellular system. This range of output power consists of six sets of output power magnitude ranging from a high output power level of approximately 600 milliwatts to a low output power level of 6 milliwatts. This six set range of output power is enabled when the PCC 101 is in the cellular system mode.

The PCC 101 is compatible with both the cordless and cellular telephone system 103. This is accomplished by enabling the PCC 101 to operate via the cordless base station 115 and cellular base stations 105, 107 and 113 using the same cellular telephone frequencies.

The radiotelephone system in FIG. 1 has desirable advantages for the user. Firstly, the PCC 101, in combination with the cordless base station 115, can automatically route an incoming call to the telephone system in which the PCC 101 is located without inconveniencing the user. Secondly, the PCC 101, in combination with the cordless base station 115, can automatically route a call in process with the PCC 101 between the cordless base station 115 and cellular base stations 105, 107 and 113 when the PCC 101 relocates therebetween. The operation of the PCC 101 is describe in detail in the aforementioned copending U.S. application, Ser. No. 07/832,118.

Figure 6:
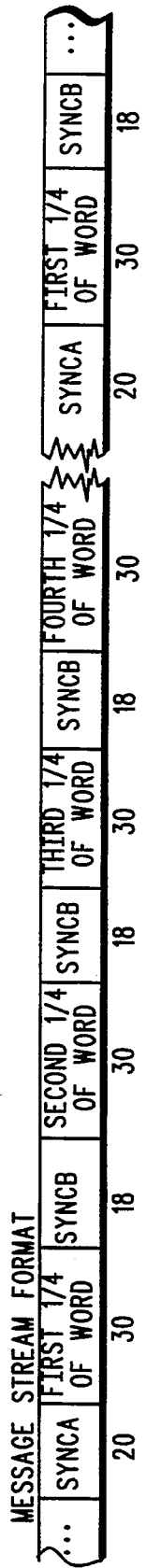
FIG. 6 is a message stream format which may be transmitted from the cordless base station in FIG. 1.

The cordless base station 115 transmits an outbound signalling message on a signalling radio channel which is selected to be non-interfering with the signalling radio channels in use in the local cellular system 103. This message is similar to that transmitted on the signalling radio channels in the conventional cellular system (see the aforementioned EIA-553 Standard) in that its purpose is to present the identity of the cordless system and aid the PCC 101 in determining its availability. The format of the message outbound from the cordless base station 115 on its signalling radio channel is shown in FIG. 6. Information is transmitted in non-return-to-zero (NRZ) format in which 20 bits of synchronization data bits (SYNCA) are followed by 30 bits of message word (comprising one-fourth the 120 NRZ bits of the entire message) followed by 18 bits of synchronization data bits (SYNCB), then 30 bits of message word. This format is continued for the four word segments to be transmitted. A continuation of the transmission of the next message word preferably follows the fourth quarter of the message word with a SYNCA synchronization. An alternative embodiment provides a break between message words and their interleaved synchronization bits, thereby making the signalling radio channel transmissions discontinuous bursts.

Figure 5:
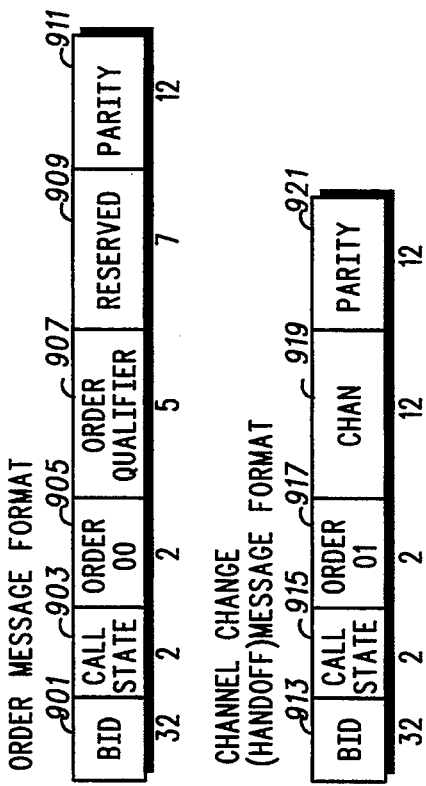
FIG. 5 is a format diagram of an order message and a channel change message which may comprise part of the message stream format in FIG. 6.

Two examples of the format for the message words are shown in FIG. 5. Each message word is transmitted in Manchester format. Since a Manchester bit is comprised of two NRZ bits of opposite state, the 60 Manchester message bits are encoded in 120 NRZ bits. The first message word example is an order message which contains a 32 bit Base IDentification field 901, a Call State field 903, an Order field 905, an Order Qualifier field 907, a field Reserved for future use 909, and a Parity check field 911. A second message word format example is a Channel Change (handoff) message also containing 60 bits. This message word also begins with a Base IDentification 913, a Call State 915, an Order 917, a go-to Channel indication 919, and a 12 bit Parity 921. Each of the word messages has a leading Base IDentification (BID) field which operates in a manner similar to the conventional System IDentification (SID) in use in cellular systems. The BID, however, contains 32 bits rather than the 15 bits in the cellular system. The BID is programmed into the cordless base station memory 315 as a number unique to each cordless base station. This unique BID provides the special characterization of each cordless base station so that a user's PCC 101 and cordless base station 115 will operate together without allowing unauthorized users to obtain access.

The two bits of the Call State field are preferably designated as follows: "00"- idle, no initialization allowed in the cordless base station; "01"- idle, initialization allowed; "10"- ringing; and "11"- conversation. The 2 bit Order field conveys the following: "00"- extended order and "01"- channel change or handoff. The Order Qualifier field of the order message word is defined as: "00000"- overhead and "00001"-send called address. The two synchronization fields are: SYNCA="0100 1001 0101 0110 1101" and SYNCB="01 0010 0101 0110 1101". Of course, other synchronization patterns may be used as long as they provide adequate cross correlation properties.

To provide better security and interference protection, the BID with the Order Message word is continuously transmitted subaudibly on the voice channel. The PCC 101 receives and decodes the BID and checks for a match between the subaudibly transmitted BID and the BID of its associated cordless base station 115. So long as the BIDs match, the conversation on the voice channel may continue. Upon detection of a mismatch, the PCC 101 received audio is muted and the PCC transmitter 403 is unkeyed. After a predetermined period of improper BID reception by the PCC 101 and a subsequent lack of received transmission from the PCC 101 to the cordless base station 115, the call is terminated.

Figure 7:
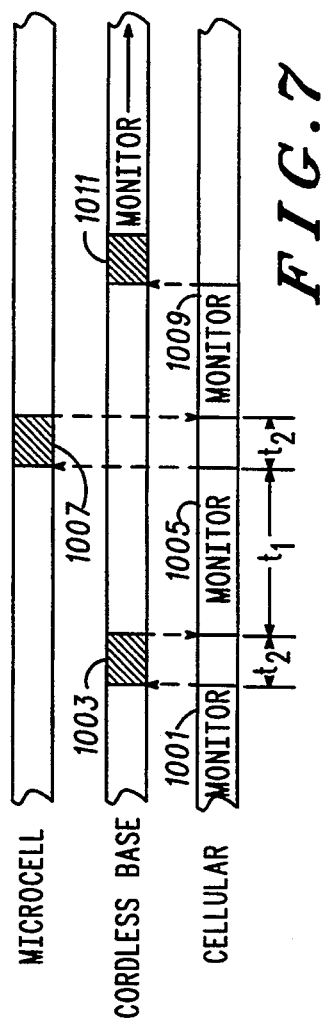
FIG. 7 is a timing diagram of the system scanning process which may be employed in the portable radiotelephone in FIG. 1.

Given that the priority established for the PCC 101 is that the cordless base station 115 is the first desired path for a user's telephone call and the conventional cellular (or the microcell system) is the second choice, the process of implementing that priority is shown in FIG. 7. The depiction in FIG. 7 is of the PCC receiver's 401 reception of the outbound signalling radio channel or set of signalling radio channels transmitted from the cellular system, the cordless base, and the microcellular system relative to time. This diagram aids in the understanding of the unique scanning priority feature of the present invention.

The PCC receiver 401 can be monitoring 1001 the outbound message stream being transmitted from the cellular system signalling radio channel (which was selected from among the plurality of cellular signalling radio channels in conventional fashion). At the appropriate time, the PCC receiver 40 1 is instructed by its microprocessor 409 to tune to the frequency or one of the frequencies being used by the cordless base station 115 as a signalling radio channel. The PCC receiver 401 scans 1003 the cordless base outbound signalling radio channel or channels for a period of time $t_2$. If the message data stream is not received with sufficient quality, the PCC receiver 401 is retuned to the previously selected message channel of the cellular system 103. It remains tuned to this message channel 1005 for a period of time, $t_1$, before attempting another scan of a message channel of one of the alternative systems. The relationship of $t_1$ and $t_2$ is such that a cellular page message (that is, a radiotelephone call or other transmitted requirement) which is repeated, conventionally, after a 5 second pause will not be missed because the PCC receiver 401 was scanning an alternative system during both cellular page message transmission times. The time $t_1$ must be greater than the sum of the pause between the two pages and the typical time to transmit two pages. The time $t_2$ must be less than the time between the two pages. If the pause time is 5 seconds and the typical time to transmit a page is 185.2 milliseconds, $t_1$ must be greater than the 5.3704 seconds and $t_2$ must be less than 5 seconds. After monitoring the cellular system message channel for a time $t_1$, the PCC receiver 401 may be instructed to tune to the message channel or to the message channels, sequentially, of the microcell system, as shown at 1007. If an adequate microcell message channel is not found during the scan of predetermined message channel frequencies, the PCC receiver 401 retunes to the cellular system message channel, as shown at 1009.

A scan to the message channels, 1011, of the cordless base station 115 which discovers a message data stream meeting appropriate quality requirements results in the PCC receiver 401 continuing to monitor the cordless message channel. The PCC receiver 401 remains on the cordless message channel without rescanning to another system until the PCC 101 cannot receive the cordless base's transmitted signal for a continuous 5 second period of time.

The effect of this priority process is to give priority to the cordless base station 115 at the PCC 101. Once the message channel of the cordless base station 115 is discovered, the PCC 101 remains tuned to this channel. Thus, when the PCC 101 is initially tuned to the cellular system it will automatically switch to the cordless base station when it is possible to access the cordless base station. Once the PCC receiver 401 has found the cordless base message channel, it remains tuned to that channel. When the PCC transceiver is first turned on, its first scan of message channels is the preestablished message channel or channels of the cordless base station 115. Of course, the user may override the automatic priority scanning hierarchy by entering an override code into the PCC 101. In this manner, the user may force the scanning of the cellular system message channels only, the cordless base message channels only, the microcellular system message channels only, or combinations of the systems. The user may also perform a call origination with a one time override to the system of his choice.

Once the message channel of a system is being monitored, a visual indication is given to the PCC transceiver user. This visual indication is provided by a set of light emitting diodes (LEDs) 415 and 417, one of which uniquely illuminates to indicate to which system the PCC transceiver is tuned. Other indicators may alternately be used to convey the same information. For example, a system identifier may appear in the number display of the PCC 101, or a flashing symbol (having different rates of flashing) may be used. Nevertheless, this indication enables the user to determine which system he is in and decide whether he wishes to complete a radiotelephone call in the indicated system.

As stated earlier, the messages or data words transmitted by cordless base station 115, microcellular base station 113, and cellular base stations 105 and 107 are typically encoded in Manchester format, since Manchester coding provides clocking information together with the data information. In the radio telephone system shown in FIG. 1, Manchester encoded messages are sent on the signalling radio channels and may also be transmitted individually or in multi-word packets on other radio channels for the purpose of communicating additional base station or system related information. By utilizing the present invention, these Manchester encoded messages communicated between the PCC 101 and cordless base station 115, microcellular base station 113, and cellular base stations 105 and 107 may be reliably processed and validated.

A message is encoded in Manchester by changing each raw message bit into two NRZ bits and a transition within the message bit. That is, a binary zero raw message bit is transformed into a binary 1-0 NRZ message stream, while a binary one raw message bit is transformed into a binary 0-1 NRZ message stream, both with a transition substantially at the middle of the message bit. As a result, each half of the Manchester message is in the opposite state. According to a feature of the present invention, this fact can be advantageously utilized to help detect errors introduced in transmission of the messages. One of the halves of a bit is in error if both halves have the same state. In other words, both a binary 1—1 and a binary 0—0 are invalid Manchester bits. A message is deemed erroneous if the number of left and right halves of individual Manchester bits that are in the same state exceeds a predetermined maximum number.

Figure 8:
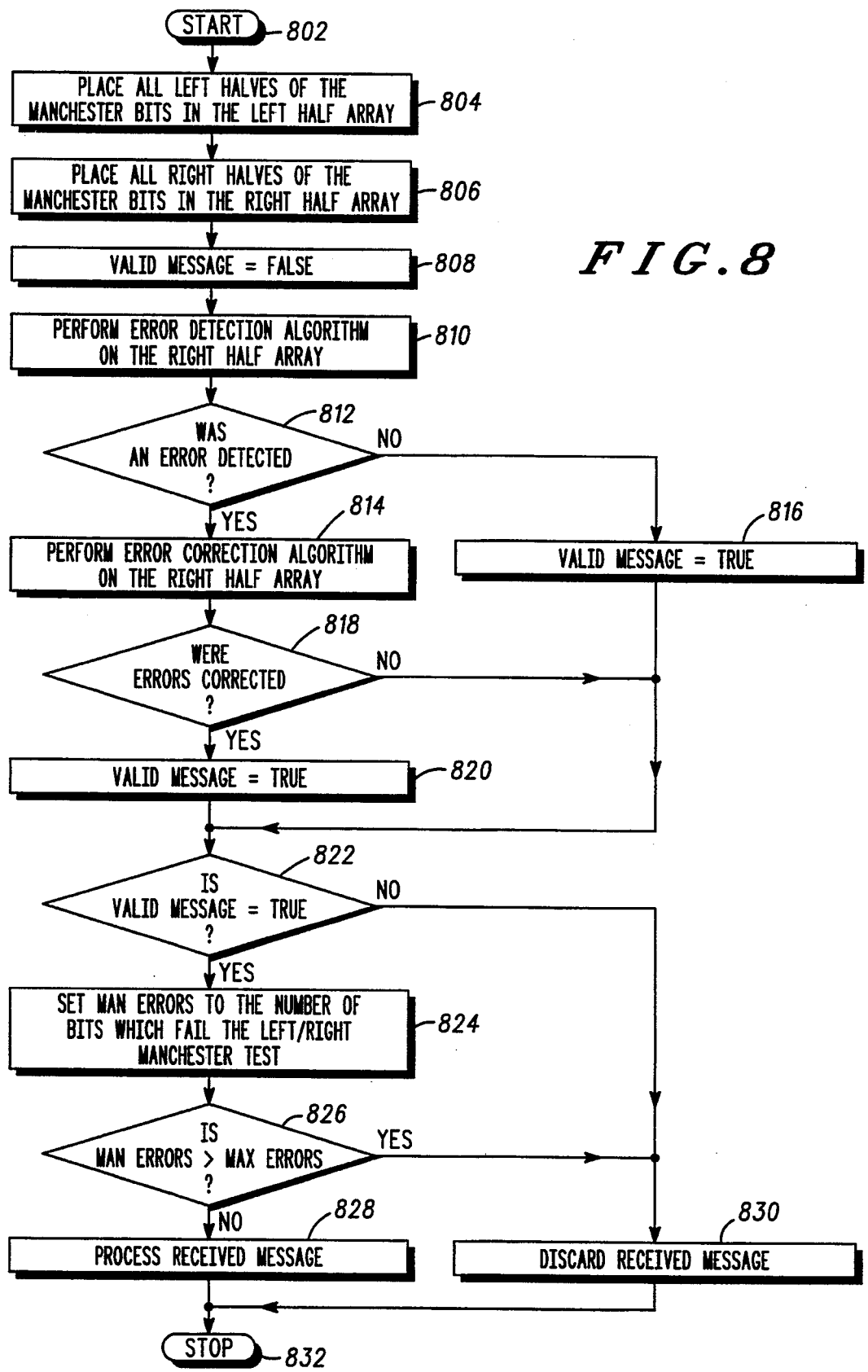

FIG. 8 contains a flowchart of the message validation process. As explained hereinabove, each of the Manchester message bits are decoded into two NRZ bit samples, a left half bit and a right half bit. The decoding of the Manchester message bits into NRZ bit samples may be implemented either in interface circuit 413 as in the aforementioned U.S. Pat. No. 4,302,845 or in microprocessor 409. Entering the flowchart at start block 802, the first thing which is done, at block 804, is to place all of the left halves of the Manchester message bits of the received message in the LEFT HALF array. Next, at block 806, the right halves of the Manchester message bits of the received message are placed into the RIGHT HALF array. The VALID MSG variable is initialized to FALSE (binary zero) at block 808. At block 8 10 the error detection algorithm is performed on the RIGHT HALF array. It is performed on the RIGHT HALF array since the right half should contain the actual bit state (i.e. a zero is represented by 10). This algorithm may be a standard Bose-Chaudhuri-Hocquenghem (BCH) decoding algorithm. The BCH decoding algorithm and other coding algorithms are described in the book by Richard E. Blahut entitled "Theory and Practice of Error Correcting Codes" published by Addison Wesley, 1983: At 810 a decision is performed based on the output of the error detection algorithm. If an error is not detected, the NO branch is taken from decision block 812 to block 816 where the VALID MSG is set to TRUE (binary one). If an error was detected, then the YES branch is taken front decision block 812 to block 814 where error correction is attempted. This again may be a standard BCH correction algorithm. The RIGHT HALF array is modified by the BCH error correction algorithm if bit errors can be corrected. The results of the error correction are examined at decision block 818. If errors were corrected, then the YES branch is taken from decision block 818 to block 820 where VALID MSG is set to TRUE. If errors were not corrected, then the NO branch is taken from decision block 818 to block 822 leaving VALID MSG set at FALSE.

Next, at block 822, the state of VALID MSG is examined. If VALID MSG is FALSE, then the NO branch is taken from decision block 822 to block 830 where the received message is discarded. If VALID MSG is TRUE, then the YES branch is taken from decision block 822 to block 824 where the left/right Manchester test is performed. At block 824, the number of bits which fail the left/right Manchester test are calculated. This number is placed in MAN ERRORS. Next, at decision block 826, a check is performed to determine if the number of left/right Manchester errors exceeds the maximum. The maximum number of left/right Manchester errors is determined by the system designer. The system designer picks this maximum such that desired system performance parameters are met. In one embodiment, a maximum of two Manchester bits were allowed to fail the left/right Manchester test. The received message was discarded if three bits had left and right halves which were in the same state. In this embodiment, the Manchester data was 25 bits long, which equates to 50 NRZ bits, 25 bits in the LEFT HALF array and 25 bits in the RIGHT HALF array).

If more that the maximum number of bits in the LEFT HALF and RIGHT HALF arrays are in the same state (i.e. MAN ERRORS is greater than MAX ERRORS), then the YES branch is taken from decision block 826 to block 830 where the message is discarded. If no more than the maximum number of bits in the LEFT HALF and RIGHT HALF arrays are in the same state (i.e. MAN ERRORS is less than or equal to MAX ERRORS), then the NO branch is taken from decision block 826 to block 828 where the received message is processed.

The process of calculating MAN ERRORS, the number of bits which fail the left/right Manchester test, is detailed in FIG. 9, which is an expansion of process block 824 in FIG. 8. Entering FIG. 9 at start block 850, the variables BIT COUNT and MAN ERRORS are set to binary zero at block 852. BIT COUNT is utilized to count through all the bits in a received message. MAN ERRORS is utilized to count the number of bits of the received message which are in error.

At decision block 854, a check is made to determine if a particular Manchester bit has left and right halves that are in the same state. If the left and right are in the same state, then the YES branch is taken from decision block 854 to block 856 where binary one is added to MAN ERRORS. If the particular Manchester bit has left and right halves that are in opposite states, then the NO branch is taken from decision block 854 to block 858 where binary one is added to BIT COUNT. Next, at decision block 860, a test is performed to determine if the last bit in the received message has been tested. If the last bit in the received message has not been tested, then the NO branch is taken from decision block 860 to block 854 where the process continues with the next bit. If the last bit in the message has been tested, then the YES branch is taken from decision block 860 to RETURN block 862 where the calculating of MAN ERRORS is terminated. Thereafter, processing continues at decision block 826 in FIG. 8.

In an alternate embodiment of the present invention, the error detection and correction can be performed on the left half of the Manchester instead of on the right half. The left and right halves of the bit must be inverted prior to the error detection and correction. The left/right Manchester test is performed as it was in the prior embodiment. However, it is performed on the inverted, error corrected versions of both the left and the fight halves. The inverted, error corrected version of the left half of the message is actually utilized for processing if the message is deemed valid.

In another alternate embodiment, error detection and correction is performed first on the right half of the message as described in the flowcharts in FIG. 8 and FIG. 9. If the message is deemed valid by this process, then the message is deemed valid and is processed. If the message is deemed invalid, the message is not discarded. In this case the process is repeated for the left half of the Manchester as described in the previous alternate embodiment. Note that the original copies of the left and right halves of the Manchester are utilized for this second process. If this results in a valid message, then the message is processed. Otherwise, the message is discarded. To summarize, this embodiment is a logical OR of the first embodiment and the first alternate embodiment.

In yet another alternate embodiment of the present invention, error detection and correction can be performed on both halves of the Manchester bit. The states of the left half bits must be inverted prior to error detection and correction. If the error detection and correction results in a valid word for both halves of the Manchester, then the inverted, error corrected left half of the message and the non-inverted, error corrected fight half of the message are compared to determine if the two messages are the same. If the two messages are the same, then the message is deemed valid. If the two messages are not the same, then the message is deemed invalid. If error detection and correction results in an invalid word for either half, the message is deemed invalid.

The foregoing embodiments of the present invention have been directed to messages encoded according to Manchester format. However, the present invention may be utilized for processing any messages or data words where two or more NRZ bit samples of each data bit are taken during reception thereof. At block 824 in FIG. 8 hereinabove, a message error possibility value may be calculated by summing the bit error possibility values over all bits in the message. That is the value of possibility of a message being in error is calculated by summing the value of the possibility that individual data bits are in error. A low value of the message error possibility indicates that there is a low likelihood of an erroneous message, and vice versa.

The data bit error possibility values can be calculated by several different techniques. First, when NRZ bit samples are taken in both halves of a data bit, the LEFT/RIGHT Manchester test can be used to calculate the value of each data bit error possibility. In this case, a binary one indicates that the left/right Manchester test failed, while a binary zero indicates that the left/right Manchester test passed. Second, the ratio of the number of samples which are not in the same state as the majority of the samples to the total number of samples can be calculated. For example, if three NRZ bit samples were taken of which two were binary ones and one sample was a binary zero, then ratio would be one-third. Third, the technique utilized in the second case above can be modified such that individual NRZ bit samples are weighted. For example, the middle sample may be considered much more reliable than the outer samples when three NRZ bit samples are available. In this case, the middle sample could be assigned a weight of two, while the outer samples are assigned a weight of one. If the middle sample is a binary zero and the outer samples are binary ones, the bit error possibility would be one half.

Regardless of the technique which is utilized, a message error possibility value is calculated. This message error possibility value is compared against a predetermined threshold value. If the message error possibility value is higher that the predetermined threshold value, then the message is discarded. If the message error possibility value is not higher that the predetermined threshold value, then the message is processed.

I claim:

1. A method of processing data transmitted on a communications channel in a data word including a plurality of data bits, said method comprising the steps of:
   receiving a data word from the communications channel, each received data bit having a binary state represented by at least two non-return-to zero (NRZ) bit samples;
   determining, on the basis of the binary state of the NRZ bit samples of each data bit, an error possibility value for the data bit;
   summing the error possibility values of all data bits of the received data word; and discarding the received data word if the sum of the error possibility values is greater than a predetermined value.

2. The method according to claim 1, wherein said method further includes the step of processing the received data word if the sum of the error possibility values is not greater than a predetermined value.

3. A method of processing data transmitted on a communications channel in a data word including a plurality of data bits and coded according to a predetermined error correcting code, said method comprising the steps of:

receiving a data word from the communications channel, each received data bit having a binary state represented by a left half non-return-to zero (NRZ) bit sample and a right half NRZ bit sample;

checking the right half NRZ bit samples of the received data word according to the predetermined error correcting code to detect the number of erroneous bits;

error correcting the right half NRZ bit samples of the received data word according to the predetermined error correcting code if the number of erroneous bits is less than a first predetermined number;

comparing the left half NRZ bit samples to the error-free or error-corrected right half NRZ bit samples of the received data word to determine the number of data bits that are in error; and discarding the received data word if it has more than a second predetermined number of data bits that are in error.

4. The method according to claim 3, wherein said method further includes the step of processing the received data word if it has no more than the second predetermined number of data bits that are in error.

5. The method according to claim 3, wherein said discarding step further includes the step of repeating the error correcting step and said comparing step with the left half NRZ bit samples if more than the second predetermined number of data bits that are in error using the right half NRZ bit samples, and discarding the received data word if it has more than the second predetermined number of data bits that are in error after using the right half NRZ bit samples and the left half NRZ bit samples.

6. The method according to claim 5, wherein said method further includes the step of processing the received data word if it has no more than the second predetermined number of data bits that are in error after using the right half NRZ bit samples and the left half NRZ bit samples.

7. Data processing apparatus for processing data transmitted transmitted on a communications channel in a data word having a plurality of data bits and coded according to a predetermined error correcting code, said error correcting apparatus comprising:

means for receiving a data word from the communications channel, each received data bit having a binary state represented by a left half non-return-to zero (NRZ) bit sample and a right half NRZ bit sample;

means for processing each received data word by:
checking the right half NRZ bit samples of the received data word according to the predetermined error correcting code to detect the number of erroneous bits;
error correcting the right half NRZ bit samples of the received data word according to the predetermined error correcting code if the number of erroneous bits is less than a first predetermined number;
comparing the left half NRZ bit samples to the error-free or the error-corrected right half NRZ bit samples of the received data word to determine the number of data bits that are in error;
discarding the received data word if it has more than a second predetermined number of data bits that are in error; and
processing the received data word if it has no more than the second predetermined number of data bits that are in error.

8. A method of processing Manchester-coded data transmitted on a communications channel in a data word including a plurality of data bits and coded according to a predetermined Bose-Chaudhuri-Hocquenghem (BCH) error correcting code, said method comprising the steps of:

receiving a data word from the communications channel, each received data bit having a binary state represented by a left half non-return-to zero (NRZ) bit sample and a right half NRZ bit sample;

checking the right half NRZ bit samples of the received data word according to the predetermined BCH error correcting code to detect the number of erroneous bits;

error correcting the right half NRZ bit samples of the received data word according to the predetermined BCH error correcting code if the number of erroneous bits is less than a first predetermined number;

comparing the left half NRZ bit samples to the error-free or the error-corrected right half NRZ bits of the received data word to determine the number of data bits that are in error; and discarding the received data word if it has more than a second predetermined number of data bits that are in error.

9. The method according to claim 8, wherein said method further includes the step of processing the received data word if it has no more than the second predetermined number of data bits that are in error.

10. The method according to claim 8, wherein said discarding step further includes the step of repeating the error correcting step and said comparing step with the left half NRZ bit samples if more than the second predetermined number of data bits that are in error using the right half NRZ bit samples, and discarding the received data word if it has more than a second predetermined number of data bits that are in error after using the right half NRZ bit samples and the left half NRZ bit samples.

11. The method according to claim 10, wherein said method further includes the step of processing the received data word if it has no more than the second predetermined number of data bits that are in error after using the right half NRZ bit samples and the left half NRZ bit samples.

12. A radio telephone, comprising:
an antenna;
cellular transceiver means operable on radio telephone channels for communicating data and radio telephone calls, said data transmitted in a data word including a plurality of data bits and coded according to a predetermined error correcting code, each received data bit having a binary state represented by a left half non-return-to zero (NRZ) bit sample and a right half NRZ bit sample;

control means and memory means for originating and receiving radio telephone calls and for transmitting and receiving the data words, said control means processing each received data word by:

checking the right half NRZ bit samples of the received data word according to the predetermined error correcting code to detect the number of erroneous bits;

error correcting the right half NRZ bit samples of the received data word according to the predetermined error correcting code if the number of erroneous bits is less than a first predetermined number;

comparing the left half NRZ bit samples to the error-corrected right half NRZ bit samples of the received data word to determine the number of data bits that are in error;

discarding the received data word if it has more than a second predetermined number of data bits that are in error; and processing the received data word if it has no more than the second predetermined number of data bits that are in error.

* * * * *

UNITED STATES PATENT AND TRADEMARK OFFICE
CERTIFICATE OF CORRECTION

PATENT NO. : 5,349,588
DATED : September 20, 1994
INVENTOR(S) : Schellinger, Michael J.

It is certified that error appears in the above-identified patent and that said Letters Patent is hereby corrected as shown below:

In column 11, line 52, please delete the second instance of the word "transmitted".

Signed and Sealed this

Seventeenth Day of January, 1995

BRUCE LEHMAN

Attest:

Attesting Officer

Commissioner of Patents and Trademarks